United States Patent [19]

Nilsson

[11] 3,884,530
[45] May 20, 1975

[54] APPARATUS FOR REGULATING THE CONTROL CURRENT TO THE ELECTRIC BRAKE SYSTEM OF A TRAILER

[75] Inventor: Rune Nilsson, Lindesberg, Sweden

[73] Assignee: AB Linde International, Lindesberg, Sweden

[22] Filed: Oct. 10, 1973

[21] Appl. No.: 405,181

[30] Foreign Application Priority Data
Oct. 12, 1972  Sweden............................ 13142/72

[52] U.S. Cl......................... 303/7; 188/3 R; 303/3; 303/15
[51] Int. Cl.............................................. B60t 7/20
[58] Field of Search................... 188/3 R, 161, 112; 200/61.29, 82 R, 82 D, 82 A, 86.5, 209; 303/3, 7, 15, 20

[56] References Cited
UNITED STATES PATENTS

| | | | |
|---|---|---|---|
| 3,350,142 | 10/1967 | Schuman | 303/7 |
| 3,497,266 | 2/1970 | Umpleby | 303/3 |
| 3,574,414 | 4/1971 | Jacob | 303/7 |
| 3,780,832 | 12/1973 | Marshall | 188/3 R |
| 3,790,807 | 2/1974 | Rossigno | 303/7 |

FOREIGN PATENTS OR APPLICATIONS

| | | | |
|---|---|---|---|
| 2,024,406 | 12/1970 | Germany | 188/112 |

Primary Examiner—Trygve M. Blix
Assistant Examiner—Stephen G. Kunin
Attorney, Agent, or Firm—Karl W. Flocks

[57] ABSTRACT

An apparatus for regulating the control current from the brake system of a tractor to the electric brake system of a trailer comprises a brake regulator connectible to the brake system of the tractor and having at least one piston, membrane, or similar device operable by the braking medium of the tractor brake system. The piston, membrane or similar device, when displaced by the braking medium against the action of a spring, being adapted to produce minute incremental variations of the current in an electronic circuit, the variations being converted into continuous variations of the voltage in the control circuit of the electric brake system of the trailer, so that a substantially continuous voltage is emitted from the control circuit in proportion to the braking of the tractor. In this context, the piston, membrane or similar device is fitted with a mutually movable portion which is adapted to actuate, across an air gap, a member fixedly attached to the electronic circuit, the variation of the width of said air gap varying the current in the electronic circuit.

3 Claims, 2 Drawing Figures

APPARATUS FOR REGULATING THE CONTROL CURRENT TO THE ELECTRIC BRAKE SYSTEM OF A TRAILER

The present invention relates to an apparatus for regulating the control current from the brake system of a tractor to the electric brake system of a trailer, said apparatus comprising a brake regulator connectible to the brake system of the tractor and having at least one piston, membrane, or similar device operable by the braking medium of the tractor brake system, said piston, membrane, or similar device, when displaced by the braking medium against the action of a spring, being adapted to produce minute incremental variations of the current in an electronic circuit, said variations being converted into continuous variations of the voltage in the control circuit of the electric brake system of the trailer, so that a substantially continuous voltage is emitted from the control circuit in proportion to the braking of the tractor. A characteristic of the invention is that the piston, membrane, or similar device is associated with a movable portion which is adapted to actuate, across an air gap, a member which is fixedly attached to the electronic circuit, the variation of the width of said air gap varying the current in said electronic circuit.

Thus, through the present invention, it has become possible to regulate continuously, completely without mechanical contacts, the voltage to the electric brakes of the trailer, said voltage being directly proportional to the hydraulic pressure or such like, of the tractor. Risk for burnt-out contacts is eliminated in the above situation. It is also of importance that the regulating apparatus according to the invention entails a very minimal lessening of the pedal travel reserve, depending on the fact that the apparatus can work with very small alterations in position. These alterations can be as small as tenths of a millimeter, even through they will, in actual practice, be 1 or 2 millimeters.

The invention will now be described in greater detail below with reference to the accompanying drawing which shows an embodiment of the invention, taken as an example, and in which.

The regulating apparatus is worked by a pedal, for which reason it is designed to be connected to the braking medium of the tractor. The braking medium can be hydraulic, pneumatic, or such like. The regulating apparatus is designed to feed out a certain voltage, when the tractor decelerates. Moreover, the regulating function is linear.

Figure 1:
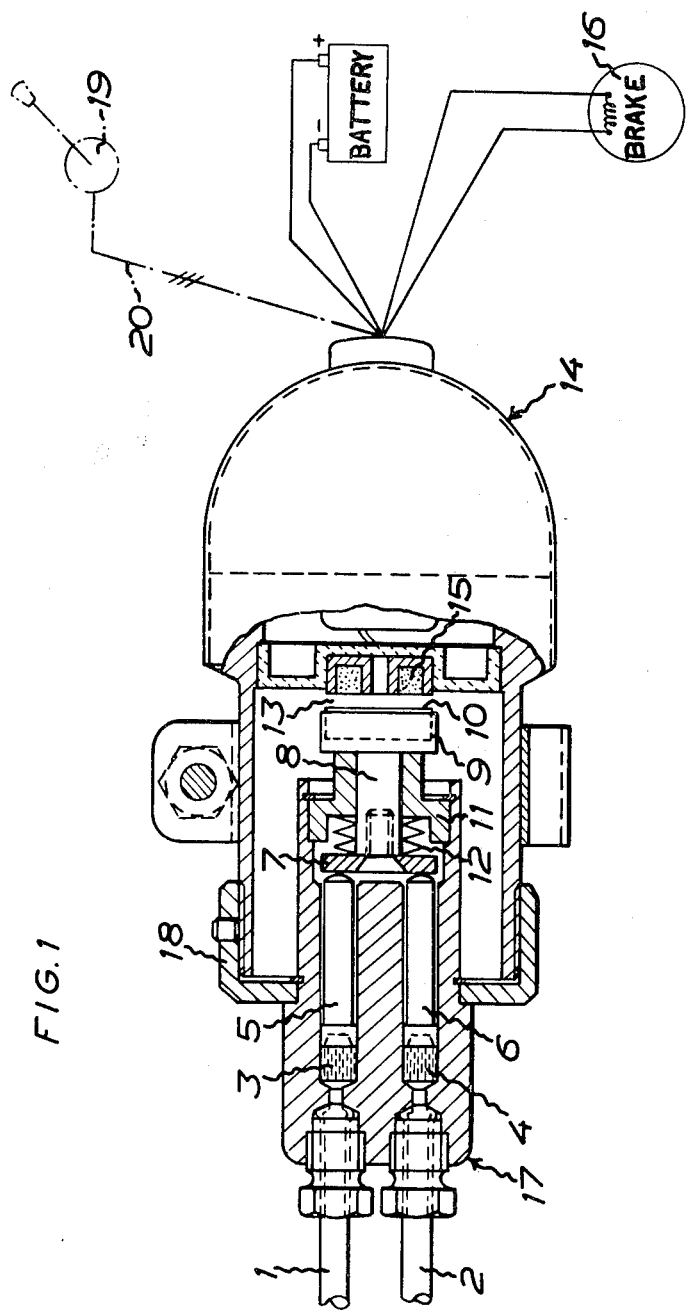
FIG. 1 shows the apparatus seen from the side, in partial section.

According to FIG. 1, the regulator is designed to be connected to both the brake circuits of the tractor, but it is also possible to connect it to only one brake circuit. The pressure medium is arranged to be conducted into the cylinders 3 and 4, via the hydraulic pipes 1 and 2 connected to the brake circuits, and there to influence the pistons 5 and 6. These pistons 5 and 6 press on a common washer 7 which is fixedly attached to a stud 8. This stud 8 is fitted with a flange 9 at the end facing away from the pistons 5 and 6, a ferrite plate 10 or such like being attached to the flange. The stud 8 is mounted in a guide 11. A pressure spring 12 is disposed between the guide 11 and the washer 7. The spring 12 comprises, according to the illustrated embodiment, a spring washer kit which, like other normal springs, has a linear characteristic.

The ferrite plate 10 is designed to actuate, via an air gap 13, a coil 15 which is fixedly attached to the electronic circuit 14. When the pressure in the brake system of the tractor changes, an axial shifting of the ferrite plate 10 against the action of the spring 12 takes place, so that the width of the air gap 13 is continuously varied. By this means, also the current in the electronic circuit 14 is varied, thus creating a variation in the inductance. This variation, which is continuous, is converted in the electronic circuit 14 into a similarly proportional continuous variation of the voltage to the electric brakes 16 of the trailer. Thus, a substantially continuous voltage is emitted to the electric brakes 16 in proportion to the braking force of the tractor since the pressure of the braking medium in the brake system of a tractor is, in principle, directly proportional to the deceleration.

Referring to FIG. 1, the apparatus comprises two main parts. Thus, it comprises the electronic circuit 14 and a hydraulic section 17 which comprises the pistons 5 and 6 together with the ferrite plate 10 actuated by said pistons. Both the parts 14 and 17 are held together by means of a nut ring 18 which may be rotated relative to the hydraulic section 17. By rotating the nut ring 18, an adjusted axial setting of the air gap 13 can be obtained without relative rotation of the parts 14 and 17. Parts 14 and 17 may be locked in their different shifting positions.

As is apparent from the drawing, a potentiometer 19 can be included in the apparatus, so that the trailer can be braked separately. This potentiometer 19 can, for example, be placed on the steering column and is connected to the main regulator via a connecting cable 20.

Figure 2:
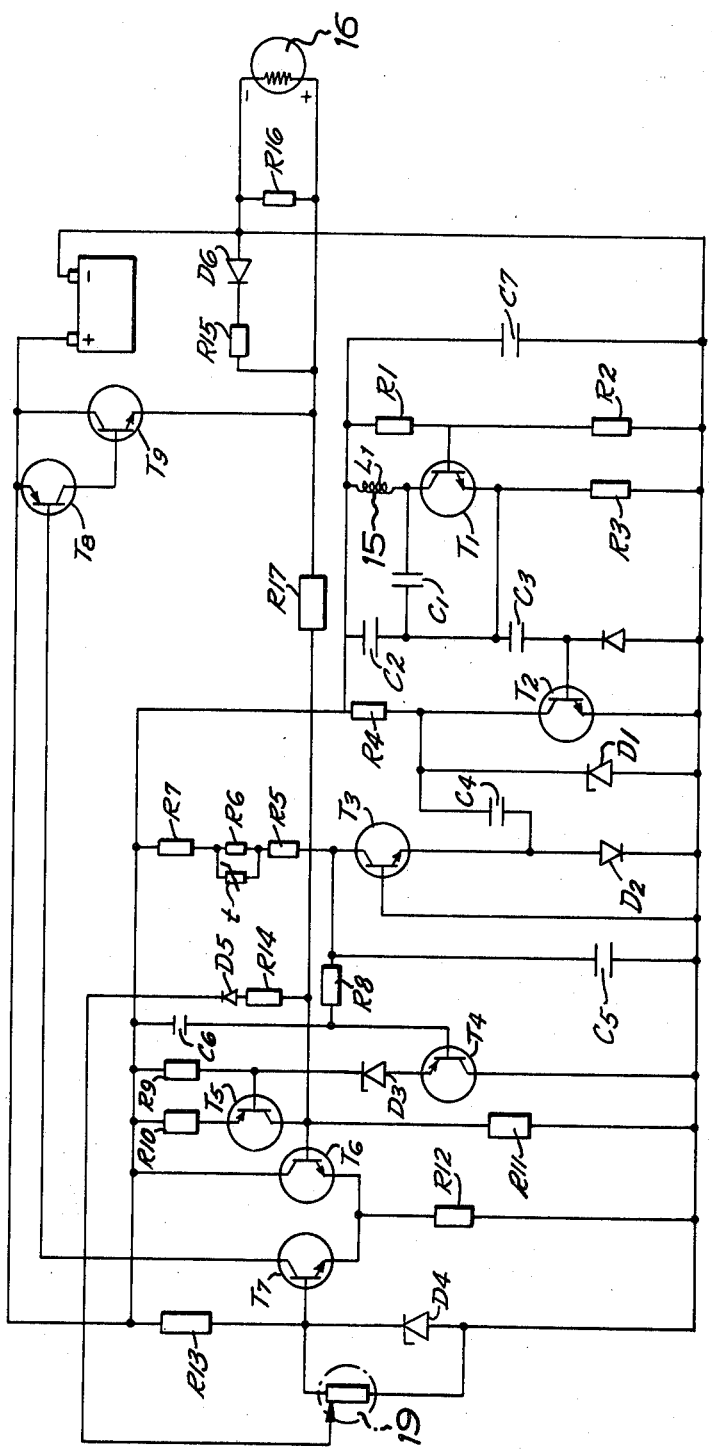
FIG. 2 shows the circuit diagram for the embodiment according to FIG. 1.

An embodiment of the circuit diagram for the apparatus is shown in FIG. 2. As in FIG. 1, the coil is designated 15, the brakes of the trailer are designated 16, and the potentiometer 19.

$T_1$ $L_1$ $R_1$ $R_2$ $R_3$ $C_1$ $C_2$ is an oscillator, the frequency $f$ of which varies when the inductance $L_1$ varies. $T_2$ is operated between saturation and cut off by voltage from the oscillator at $C_3$. $C_4$ is charged and discharged with the frequency $f$ to the Zener voltage $V_2$ for the diode $D_1$.

The current of T will then be:

$$I = f \cdot V_2 \cdot C_4$$

i.e. the proportional to $f$.

The voltage across $R_7$ $R_6$ $R_5$ will be proportional of $f$. The voltage is filtered by means of $C_5$ $R_8$ $C_6$. It is supplied via the emitter follower $T_4$ to the base of $T_5$. A constant part of this voltage is subtracted with the Zener voltage of $D_3$. The current from $T_5$ is supplied to the differential stage $T_6$ $T_7$. A reduction of the current in $T_5$ will reduce the current in $T_6$, the current in $T_7$ increasing and supplying current to $T_8$ operating the output transistor $T_9$. $D_6 R_{15}$ reduces the negative voltage peak arising upon disconnection. $R_{17}$ is a negative feedback resistor determining the gain in the amplifier.

The invention is not limited to that described above and shown on the drawing but may be amended in various ways within the scope of the appended claims.

What I claim and desire to secure by Letters Patent is:

1. An apparatus for regulating the control current from the brake system of a tractor to the electric brake system of a trailer, said apparatus comprising a brake regulator connectible to the brake system of the tractor and having at least one piston, membrane, or similar device operable by the braking medium of the tractor brake system, said piston, membrane, or similar device, when displaced by the braking medium against the action of a spring, being adapted to produce minute incremental variations of the current in an electronic circuit converted into continuous variations of the voltage in the control circuit of the electric brake system of the trailer, so that a substantially continuous voltage is emitted from the control circuit in proportion to the braking of the tractor, wherein the piston, membrane, or similar device is associated with a movable portion which is adapted to actuate, across an air gap, a member which is fixedly attached to the electronic circuit, the variation of the width of said air gap varying the inductance in said electronic circuit.

2. An apparatus for regulating the control current from the brake system of a tractor to the electric brake system of a trailer, said apparatus comprising a brake regulator connectible to the brake system of the tractor and having at least one piston, membrane, or similar device operable by the braking medium of the tractor brake system, said piston, membrane, or similar device, when displaced by the braking medium against the action of a spring, being adapted to produce minute incremental variations of the current in an electronic circuit converted into continuous variations of the voltage in the control circuit of the electric brake system of the trailer, so that a substantially continuous voltage is emitted from the control circuit in proportion to the braking of the tractor, wherein the piston, membrane, or similar device is associated with a movable portion which is a ferrite plate adapted to actuate, across an air gap, a member which is fixedly attached to the electronic circuit and comprises a coil, the variation of the width of said air gap being designed to produce a variation in the inductance of the electronic circuit.

3. An apparatus according to claim 2, wherein the electronic circuit is movably arranged in relation to a unit which is fitted with the piston, membrane or similar device, and may be locked in its different shifting positions for the purposes of adjusting the air gap between the portion shiftable with said piston, membrane or similar device and the portion which is fixedly attached to the electronic circuit.

* * * * *